United States Patent
Chen et al.

(10) Patent No.: US 11,455,662 B2
(45) Date of Patent: Sep. 27, 2022

(54) OPTIMIZING GENERATION OF A FEED OF CONTENT FOR A USER BASED ON PRIOR USER INTERACTIONS WITH THE FEED OF CONTENT

(71) Applicant: Meta Platforms, Inc., Menlo Park, CA (US)

(72) Inventors: Zeyue Chen, Sunnyvale, CA (US); Tanmoy Chakraborty, San Mateo, CA (US); Sergey Markov, Menlo Park, CA (US); Harsh Doshi, San Francisco, CA (US); Wei Wei, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 302 days.

(21) Appl. No.: 15/806,704

(22) Filed: Nov. 8, 2017

(65) Prior Publication Data

US 2019/0139096 A1    May 9, 2019

(51) Int. Cl.
 *G06Q 30/00* (2012.01)
 *G06Q 30/02* (2012.01)
 *G06Q 50/00* (2012.01)

(52) U.S. Cl.
 CPC ..... *G06Q 30/0275* (2013.01); *G06Q 30/0269* (2013.01); *G06Q 30/0277* (2013.01); *G06Q 50/01* (2013.01)

(58) Field of Classification Search
 None
 See application file for complete search history.

(56) References Cited

U.S. PATENT DOCUMENTS 7,979,877 B2    7/2011 Huber et al.
8,019,746 B2    9/2011 Liu
(Continued)

FOREIGN PATENT DOCUMENTS

JP    2016173865 A  *  9/2016  ......... G06Q 30/0255
JP    2019049984 A  *  3/2019  ........... G06F 16/958
(Continued)

OTHER PUBLICATIONS

IAB. "IAB Deep Dive on In-Feed Ad Units—A supplement to the IAB Native Advertising Playbook." (Jul. 2015). Retrieved online May 13, 2022. https://www.iab.com/wp-content/uploads/2015/07/IAB_Deep_Dive_on_InFeed_Ad_Units.pdf (Year: 2015).*
(Continued)

*Primary Examiner* — James A Reagan
(74) *Attorney, Agent, or Firm* — Fenwick & West LLP (57) ABSTRACT

An online system provides a feed of content including organic content items and sponsored content items that are positioned relative to each other to maximize user interaction with the feed of content. To reduce latency of providing the feed of content to a user without impairing positioning of organic content items and sponsored content items relative to each other, the online system generates the feed of content including organic content items and sends the feed of content to a client device while selecting sponsored content items for the feed of content. The online system transmits selected sponsored content items to the client device, which modifies the feed of content to include the sponsored content items and presents the modified feed of content.

16 Claims, 3 Drawing Sheets

(56) References Cited

U.S. PATENT DOCUMENTS

| | | | |
|---|---|---|---|
| 8,458,039 B1* | 6/2013 | Schuster | G06Q 30/00 705/26.1 |
| 8,473,358 B1* | 6/2013 | Schuster | G06Q 30/00 705/26.1 |
| 8,522,273 B2 | 8/2013 | Huber et al. | |
| 9,185,134 B1* | 11/2015 | Story, Jr. | H04L 63/104 |
| 9,317,812 B2 | 4/2016 | Kabiljo et al. | |
| 9,553,922 B1* | 1/2017 | Guarraci | H04N 21/6582 |
| 9,553,939 B2* | 1/2017 | Yu | H04L 67/535 |
| 9,591,339 B1* | 3/2017 | Christie | H04N 21/2541 |
| 9,645,702 B2 | 5/2017 | Schoen et al. | |
| 9,729,495 B2 | 8/2017 | Yu et al. | |
| 9,865,017 B2 | 1/2018 | Huber et al. | |
| 9,922,335 B2 | 3/2018 | Chakraborty et al. | |
| 10,003,922 B2 | 6/2018 | Kalis et al. | |
| 10,061,826 B2* | 8/2018 | Helvik | G06F 16/248 |
| 10,212,468 B1 | 2/2019 | Sahyoun et al. | |
| 10,325,291 B2* | 6/2019 | Ge | G06Q 30/0246 |
| 10,373,271 B2* | 8/2019 | Feldman | G06Q 50/01 |
| 10,419,560 B2* | 9/2019 | Yu | G06Q 50/01 |
| 11,030,208 B2* | 6/2021 | Helvik | G06F 16/24575 |
| 11,062,358 B1* | 7/2021 | Lewis | G06Q 30/0277 |
| 2007/0136750 A1 | 6/2007 | Abanami et al. | |
| 2009/0133059 A1* | 5/2009 | Gibbs | G06F 16/48 725/34 |
| 2011/0078014 A1* | 3/2011 | Feldman | G06Q 30/0243 705/14.42 |
| 2013/0024293 A1 | 1/2013 | Tinsman et al. | |
| 2013/0031582 A1 | 1/2013 | Tinsman et al. | |
| 2013/0173394 A1* | 7/2013 | Birch | H04N 21/4532 705/14.66 |
| 2013/0246521 A1* | 9/2013 | Schacht | H04L 67/535 709/204 |
| 2013/0325585 A1* | 12/2013 | Amit | G06Q 30/0241 705/14.66 |
| 2013/0332523 A1* | 12/2013 | Luu | G06F 16/9535 709/204 |
| 2013/0337657 A1 | 12/2013 | Savas et al. | |
| 2014/0019261 A1* | 1/2014 | Hegeman | G06Q 30/0241 705/14.71 |
| 2014/0108145 A1* | 4/2014 | Patel | G06Q 30/0257 705/14.54 |
| 2014/0143163 A1 | 5/2014 | Kamat et al. | |
| 2014/0164138 A1 | 6/2014 | Jayaram et al. | |
| 2015/0046515 A1* | 2/2015 | Pei | H04L 67/01 709/203 |
| 2015/0066594 A1 | 3/2015 | Li et al. | |
| 2015/0081449 A1* | 3/2015 | Ge | G06F 3/0482 705/14.66 |
| 2015/0100415 A1 | 4/2015 | Yu et al. | |
| 2015/0100423 A1 | 4/2015 | Oldham | |
| 2015/0278375 A1 | 10/2015 | Kim et al. | |
| 2015/0278962 A1 | 10/2015 | Agarwal et al. | |
| 2015/0317675 A1* | 11/2015 | Bhamidipati | G06Q 50/01 705/14.53 |
| 2015/0317688 A1* | 11/2015 | Bhamidipati | G06Q 50/01 705/14.66 |
| 2015/0317689 A1* | 11/2015 | Bhamidipati | G06Q 30/0269 705/14.66 |
| 2015/0332314 A1* | 11/2015 | Chakraborty | G06Q 30/0246 705/14.45 |
| 2015/0363407 A1* | 12/2015 | Huynh | G06F 16/35 707/738 |
| 2016/0021213 A1* | 1/2016 | Ruan | H04L 65/40 709/204 |
| 2016/0027061 A1* | 1/2016 | Chakraborty | G06Q 30/0275 705/14.66 |
| 2016/0070764 A1* | 3/2016 | Helvik | G06F 16/24575 707/734 |
| 2016/0092938 A1* | 3/2016 | Tang | G06Q 30/0277 705/14.73 |
| 2016/0162953 A1* | 6/2016 | Tang | G06Q 30/0269 705/14.66 |
| 2016/0196359 A1* | 7/2016 | Djabarov | G06Q 50/01 707/722 |
| 2016/0219119 A1* | 7/2016 | Yu | G06Q 50/01 |
| 2016/0241504 A1* | 8/2016 | Raji | H04W 4/02 |
| 2016/0283984 A1* | 9/2016 | Rabbat | H04L 51/18 |
| 2016/0291805 A1* | 10/2016 | Yu | G06Q 30/02 |
| 2016/0291914 A1* | 10/2016 | Yu | G06Q 30/0277 |
| 2016/0358229 A1* | 12/2016 | Bhalgat | G06Q 30/0269 |
| 2016/0371744 A1 | 12/2016 | Crow | |
| 2016/0373396 A1* | 12/2016 | Sorg | G06Q 50/01 |
| 2017/0061462 A1* | 3/2017 | Bhalgat | G06Q 30/0225 |
| 2017/0124061 A1* | 5/2017 | Amerige | H04L 67/01 |
| 2017/0126825 A1* | 5/2017 | Yu | G06F 3/04883 |
| 2017/0156033 A1 | 6/2017 | Kalis et al. | |
| 2017/0171342 A1* | 6/2017 | Wang | H04L 67/55 |
| 2017/0262869 A1 | 9/2017 | Jalali et al. | |
| 2018/0082125 A1 | 3/2018 | Katz et al. | |
| 2018/0253800 A1* | 9/2018 | Feldman | G06Q 50/01 |
| 2018/0349452 A1* | 12/2018 | Helvik | G06F 16/24578 |
| 2019/0102806 A1* | 4/2019 | Doshi | H04N 21/812 |
| 2019/0122230 A1 | 4/2019 | Ezra | |
| 2019/0139096 A1 | 5/2019 | Chen et al. | |
| 2021/0263917 A1* | 8/2021 | Helvik | G06Q 50/01 |

FOREIGN PATENT DOCUMENTS

| | | | | |
|---|---|---|---|---|
| WO | WO-9628933 A1 * | 9/1996 | | G11B 27/002 |
| WO | WO-2008112944 A1 * | 9/2008 | | G06N 3/006 |
| WO | WO-2009029559 A1 * | 3/2009 | | G06N 3/006 |
| WO | WO-2009145902 A1 * | 12/2009 | | G06F 17/30893 |

OTHER PUBLICATIONS

Mark Rogers. "Measuring the diffusion of marketing messages across a social network." (Nov. 26, 2012). Retrieved online May 13, 2022. https://link.springer.com/article/10.1057/dddmp.2012.25 (Year: 2012).*

Melissa Wang. "The Essential Guide to Social Media Advertising." (Feb. 4, 2016). Retrieved online May 13, 2022. https://cdn2.hubspot.net/hub/53/file-2243895600-pdf/The_Essential_Guide_to_Social_Media_Advertising.pdf (Year: 2016).*

Rudloff et al. "Social media and the Impacton marketing Communication." (Jun. 4, 2010). Retrieved online May 13, 2022. https://www.diva-portal.org/smash/get/diva2:1030631/FULLTEXT01.pdf (Year: 2010).*

United States Office Action, U.S. Appl. No. 15/721,664, filed Oct. 31, 2019, 32 pages.

United States Office Action, U.S. Appl. No. 15/964,016, filed May 13, 2020, 35 pages.

* cited by examiner

OPTIMIZING GENERATION OF A FEED OF CONTENT FOR A USER BASED ON PRIOR USER INTERACTIONS WITH THE FEED OF CONTENT

BACKGROUND

This disclosure relates generally to presenting content to users of an online system, and more specifically to generating feed of content for presentation to a user of the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Many online systems present sponsored content together with organic content, which is content for which the online system does not receive compensation for presenting. However, presenting sponsored content and organic content together divides a user's attention between the sponsored content and the organic content, which may decrease user interaction with organic content, causing a decrease in overall user interaction with the online system. An online system may offset presentation of sponsored content items to users along with organic content by accounting for a user's likelihood of interacting with sponsored content and organic content based on a position in a feed of content in which the sponsored content or the organic content is presented. While accounting for positions in a feed of content in which organic content or sponsored content is presented allows an online system to increase user interaction with the organic content and the sponsored content, accounting for positions of organic content and sponsored content in a feed of content may reduce an amount of time for an online system to generate the feed of content, impairing the quality of the content included in the feed or may increase a latency for the online system to provide the feed of content to a user.

SUMMARY

An online system receives and maintains sponsored content items from one or more publishing users. Each sponsored content item includes content for presentation to users of the online system as well as a bid amount specifying an amount of compensation a publishing user provides to the online system in exchange for presenting the sponsored content item. For example, the bid amount included in a sponsored content item identifies an amount of compensation provided by a publishing to the online system if content in the sponsored content item is presented to a user, if a user to whom content in the sponsored content item is presented performs one or more actions after being presented with the content, or if any suitable condition is satisfied when content in the sponsored content item is presented to a user. Additionally, a sponsored content item may also include targeting criteria specifying characteristics of users of the online system who are eligible to be presented with content from the sponsored content item in various embodiments. If a sponsored content item includes targeting criteria, the content item is eligible for presentation to users having characteristics satisfying at least a threshold amount of the targeting criteria and is not eligible for presentation to users having characteristics that do not satisfy at least the threshold amount of the targeting criteria.

After receiving one or more sponsored content items, the online system receives a request for a feed of content from a client device associated with a user of the online system and retrieves characteristics of the user requesting the feed of content maintained by the online system. Any suitable characteristics of the user maintained by the online system may be retrieved. For example, the online system retrieves connections between the user and other users or objects maintained by the online system, interests of the user from a user profile maintained for the user, demographic information included in a user profile maintained for the user, actions performed by the user and logged by the online system, and content items previously presented to the user by the online system.

Using the retrieved characteristics, the online system retrieves organic content items maintained by the online system for the user. An organic content item is a content item that does not include a bid amount. Hence, the online system does not receive compensation from a publishing user in exchange for presenting content included in an organic content item or for users performing a specific interaction after being presented with content from the organic content item. In various embodiments, the organic content item includes content describing one or more actions performed by other users connected to the user via the online system or describing content posted to a page, event, or other object connected to the user via the online system.

The online system selects a set of organic content items by applying one or more selection processes to characteristics of the user and characteristics of the retrieved organic content items. In various embodiments, the online system determines measures of relevance to the user for each organic content item of the set. A measure of relevance to the user for an organic content item is determined by applying one or more models to characteristics of the organic content item and characteristics of the user. In various embodiments, an organic content item's measure of relevance to the user is based on a likelihood of the user performing one or more interactions with the organic content item; the likelihood of the user performing an interaction with the organic content item is determined based on prior interactions by the user with previously presented content items, characteristics of the content item, characteristics of previously presented content items with which the user interacted, and characteristics of the user in various embodiments. In various embodiments, the online system selects the set of organic content items as organic content items having at least a threshold measure of relevance to the user. Alternatively, the online system ranks organic content items based on their measures of relevance to the user and selects the set of organic content items as organic content items having at least a threshold position in the ranking.

For each of the set of organic content items, the online system determines a value to the online system of presenting an organic content item of the set of organic content items to the online system and generates the feed of content including organic content items of the set of organic content items in positions relative to each other determined by the values to the online system of presenting each of the set of organic content items. The value for an organic content item is based at least in part on an expected amount of interaction by the user with the organic content item. The value of an organic content item may be based on specific types of prior actions (e.g., commenting, expressing a preference for a content item, sharing a content item, etc.) by the user associated with previously presented organic content items, in some embodiments. For example, the expected amount of interaction is determined based on the user's prior indications of preference for previously presented organic content items within a specified time interval or based on the user's accessing of previously presented advertisements within a specified time interval.

In various embodiments, when generating the feed of content, the online system applies a position discount corresponding to a position in the feed of content including an organic content item. The value for an organic content item of the set of organic content items is affected by a position of the feed in which the organic content item is presented, so the online system applies a position discount corresponding to the position in the feed in which the organic content item is presented. To generate the feed of content, the online system inserts organic content items of the set of organic content items in different positions of the feed of content and combines values for the organic content items weighted by position discounts corresponding to positions of the feed of content including the organic content items and generates the feed of content to include organic content items of the set in positions of the feed of content that maximizes a combination of values for the organic content items weighted by position discounts corresponding to positions of the feed of content including the organic content items. This allows the online system to generate the feed of content to include organic content items in positions relative to each other that maximizes potential interaction by the user with the feed of content.

The online system transmits the generated feed of content, which includes organic content items, to the client device. After receiving the feed of content, the client device. The online system subsequently selects a sponsored content item for inclusion in the feed of content. By transmitting the feed of content to the client device before selecting the sponsored content item for the feed of content, the online system allows the user to more quickly view and to interact with organic content items included in the feed of content, while allowing the online system to include a sponsored content item in the feed of content with which the user is most likely to interact. In various embodiments, when the online system generates the feed of content, the online system identifies one or more positions within the feed of content in which sponsored content items are included. The online system may apply one or more content policies that restrict certain content items from being presented in specified positions in feeds of content to the generated feed that includes organic content items in various positions. For example, a content policy prevents presentation of sponsored content items in certain positions of a content feed (e.g., a first or top position in the feed). As another example, a content policy specifies a minimum number of organic content items separating sponsored content items in the feed of content. Application of the one or more content policies allows the online system to identify one or more positions of the feed of content in which content items are eligible to be included.

To include a sponsored content item in a position of the feed of content relative to one or more organic content items, the online system selects a maintained sponsored content item based on expected values for various sponsored content items and a position discount of the position of the feed of content. For example, the online system identifies a position discount corresponding to the position of the feed of content, weights expected values of different sponsored content items by the position discount, and selects a sponsored content item based on the weighted expected values. In some embodiments, the online system selects a sponsored content item having a maximum expected value weighted by the position discount for the position of the feed of content. Alternatively, the online system determines a score for each sponsored content item, with a score of a sponsored content item based on an expected value of the sponsored content item and an expected amount of interaction with content from the sponsored content item by the user. This allows the score of a sponsored content item to account for the expected compensation to the online system from presenting the sponsored content item as well as a benefit to the online system from interaction with the sponsored content item. In various embodiments, the online system uses a conversion factor to convert the bid amount included in a sponsored content item, or the expected value of a sponsored content item, and the expected amount of interaction by the user with the sponsored content item into a common unit of measurement, allowing a single score associated with the advertisement to account for the expected amount of user interaction with the sponsored content item and the bid amount included in the sponsored content item (or the expected value of the sponsored content item).

The online system selects the sponsored content item for inclusion in the position of the feed of content relative to one or more organic content items by combining values for the organic content items included in the feed of content weighted by position discounts corresponding to positions of the feed of content including the organic content items and scores for various sponsored content items weighted by the position discount corresponding to the position of the feed. In some embodiments, the online system identifies a set of sponsored content items based on their expected values (e.g., sponsored content items having at least a threshold expected value or sponsored content items having at least a threshold position in a ranking based on expected values) and combines values for the organic content items included in the feed of content weighted by position discounts corresponding to positions of the feed of content including the organic content items and scores for various sponsored content items of the identified set weighted by the position discount corresponding to the position of the feed. The online system selects a sponsored content for inclusion in the position as a sponsored content item that maximizes a combination of values for the organic content items weighted by position discounts corresponding to positions of the feed of content including the organic content items and a score for the sponsored content item weighted by the position discount of the position. This allows the online system to select a sponsored content item of the subset that that maximizes potential interaction by the user with the feed of content, while maximizing an expected amount of compensation the online system 140 receives from presentation of the sponsored content item.

The online system transmits content from the selected sponsored content item or transmits the sponsored content item to the client device for presentation to the user. In various embodiments, the online system transmits the content from the selected sponsored content item and an identifier of the position of the feed of content in which the content from the selected sponsored content item is to be presented to client device. The online system may alternatively or additionally transmit instructions for including the selected sponsored content item in the position of the feed of content in conjunction with the selected sponsored content item; hence, executing the instructions received in conjunction with the selected sponsored content item allows the client device to modify the feed of content to include the selected sponsored content item.

The client device modifies the feed of content previously received from the online system to include the selected sponsored content item and presents the modified feed of content to the user. In various embodiments, the client device receives one or more content policies restricting positioning of the sponsored content item within the feed of content relative to organic content items included in the feed of content along with the selected sponsored content item. The client device applies one or more of the content policies to the previously received feed of content to determine a position of the feed of content in which the sponsored content item is included and modifies the feed of content to include the sponsored content item in the determined position. In various embodiments, the client device determines whether a position in the feed of content received along with the sponsored content item has previously been presented to the user and determines an alternative position in the feed of content in which the selected sponsored content item is included. For example, the client device applies the one or more content policies to the feed of content to determine the alternative position of the feed of content in response to determining the position in the feed of content received along with the sponsored content item has previously been presented to the user.

The client device stores the one or more content policies prior to receiving the selected sponsored content item in various embodiments. For example, the one or more content policies are included in an application associated with the online system so the one or more content policies are stored on the client device when the application associated with the online system is installed on the client device. The online system may transmit the one or more content policies to the client device at various times (e.g., at periodic time intervals), and the client device stores the one or more content policies. When the client device receives the selected sponsored content item, the client device retrieves the locally stored one or more content policies and applies the one or more content policies to the feed of content to identify a position of the feed of content in which the selected sponsored content item is included.

In various embodiments, the client device may use any suitable criteria to identify an alternative position of the feed of content in which the selected sponsored content item is included. For example, in response to determining the position the position in the feed of content received along with the sponsored content item has previously been presented to the user, the client device identifies an ending position of the feed of content presented to the user by the client device and modifies the feed of content to include the selected sponsored content item in a position of the feed subsequent to the identified ending position of the feed of content. The position of the feed subsequent to the identified ending position of the feed of content may be determined by application of one or more content policies to the feed of content by the client device in various embodiments. As another example, in response to determining the position in the feed of content received along with the sponsored content item has previously been presented to the user, the client device identifies an alternative position in the feed that is subsequent to the position in the feed of content and modifies the feed of content to include the selected sponsored content item in the alternative position. The client device may apply one or more content policies or any other suitable criteria to identify the alternative position in the feed.

Additionally, the client device may determine not to include the selected sponsored content item in the feed of content based on any suitable characteristics. If the client device determines not to include the selected sponsored content item in the feed of content, the client device transmits a notification to the online system that the selected sponsored content item is not included in the feed of content. For example, the client device determines that at least a threshold amount of the feed of content has been presented to the user or that the user has performed one or more specific actions with the feed of content and does not include the selected sponsored content item in the feed of content in response to the determination. In the preceding example, the client device does not modify the feed of content to include the selected sponsored content item and transmits a notification to the online system that the selected sponsored content item is not included in the feed of content. If the online system receives a notification that the selected sponsored content item was not included in the feed of content, the online system may store the selected sponsored content item in association with the user to increase a likelihood of the online system include in the sponsored content item when the online system generates another feed of content or selects additional content for inclusion in the feed of content.

By initially generating the feed of content including organic content items selected or the user and transmitting the feed of content including the organic content items to a client device for presentation while the online system selects a sponsored content item for inclusion in the feed of content, the online system reduces an amount of time from receiving a request for a feed of content from a user and presentation of the feed of content to the user. Including organic content items in the feed of content initially presented to the user allows the online system to provide the user with content likely to increase user interaction with the online system. Selecting one or more sponsored content items for inclusion in the feed of content while the organic content items included in the feed of content are presented and subsequently modifying the feed of content to include the selected one or more sponsored content items, allows the online system to select sponsored content items more likely to increase user interaction with the feed of content or to increase compensation to the online system from presentation of sponsored content items by performing a more detailed selection process or allocation more time for selecting sponsored content items. For example, transmitting a feed of content including organic content items and subsequently selecting one or more sponsored content items to include in the feed of content allows the online system to account for contextual information about the feed of content (e.g., organic content items included in the feed, a position of a sponsored content item in the feed of content relative to organic content items included in the feed of content) when selecting sponsored content items, which may increase compensation received by the online system, without delaying presentation of organic content items to a user. As evaluating sponsored content items while accounting for contextual information about the feed of content (e.g., organic content items included in the feed, a position of a sponsored content item in the feed of content relative to organic content items included in the feed of content) including one or more of the sponsored content items is computationally intensive, providing the organic content items included in the feed of content to the user while selecting sponsored content items increases a quality of a sponsored content item selected for inclusion in a position of the feed of content without delaying presentation of organic content items included in the feed of content to a user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
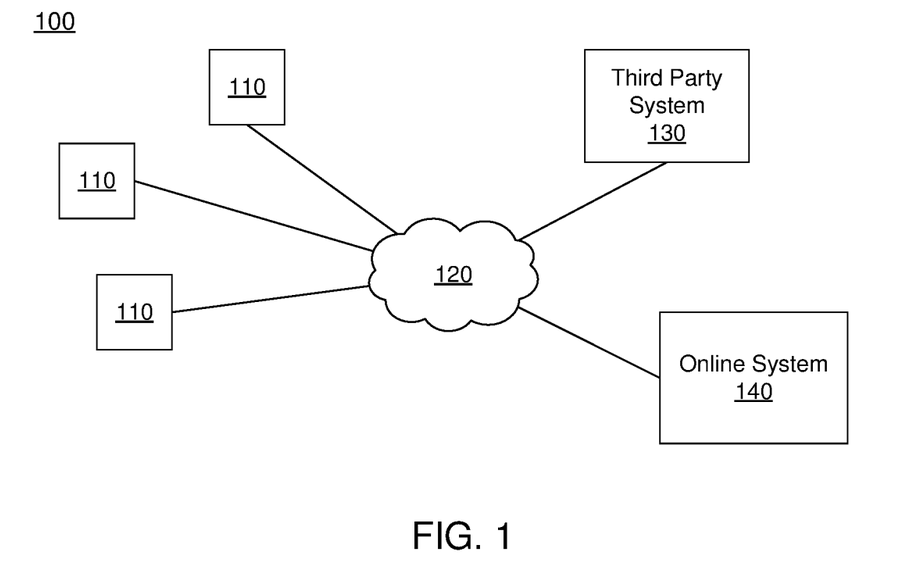
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 140 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item.

Figure 2:
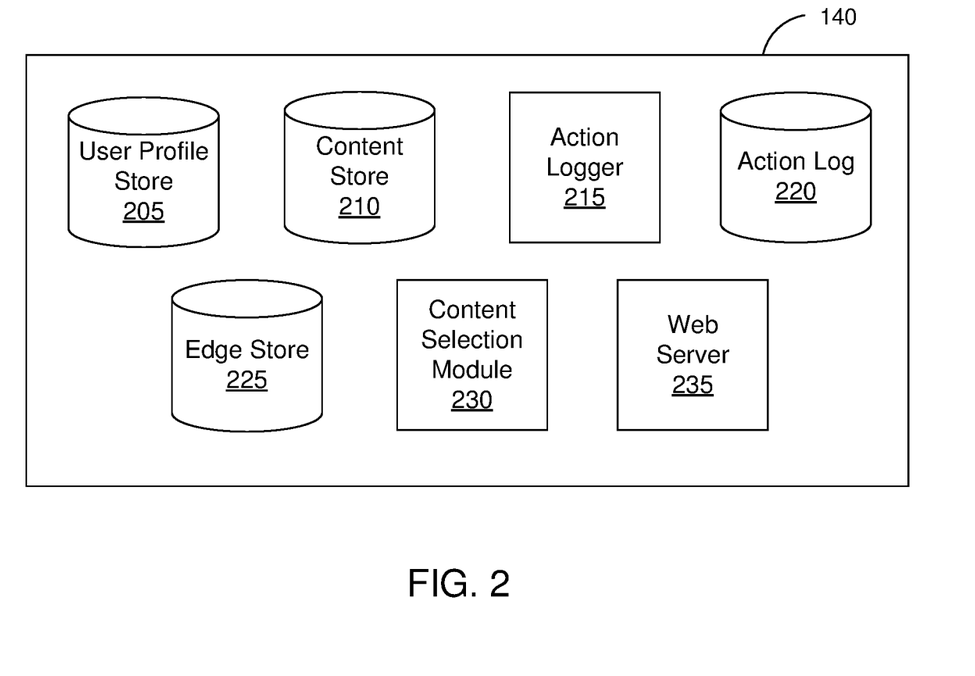
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. As used herein, a content item including a bid amount is referred to as a "sponsored content item," while a content item that does not include a bid amount is referred to as an "organic content item." The creative is text, image, audio, video, or any other suitable data presented to a user. In various embodiments, the creative also specifies a page of content. For example, a content item includes a landing page specifying a network address of a page of content to which a user is directed when the content item is accessed. The bid amount included in a sponsored content item specifies an amount of compensation the online system 140 receives from a publishing user associated with the sponsored content item and is used to determine an expected value, such as monetary compensation, provided by the publishing user to the online system 140 if content in the sponsored content item is presented to a user, if the content in the sponsored content item receives a user interaction when presented, or if any suitable condition is satisfied when content in the sponsored content item is presented to a user. For example, the bid amount included in a sponsored content item specifies a monetary amount that the online system 140 receives from a publishing user who provided the sponsored content item to the online system 140 if content in the sponsored content item is displayed. In some embodiments, the expected value to the online system 140 of presenting the content from the sponsored content item may be determined by multiplying the bid amount by a probability of the content of the sponsored content item being accessed by a user.

Various sponsored content items may include an objective identifying an interaction that a user associated with a sponsored content item desires other users to perform when presented with content included in the sponsored content item. Example objectives include: installing an application associated with a sponsored content item, indicating a preference for a sponsored content item, sharing a sponsored content item with other users, interacting with an object associated with a sponsored content item, or performing any other suitable interaction. As content from a sponsored content item is presented to online system users, the online system 140 logs interactions between users presented with the sponsored content item or with objects associated with the sponsored content item. Additionally, the online system 140 receives compensation from a publishing user associated with a sponsored content item as online system users perform interactions with the sponsored content item that satisfy the objective included in the sponsored content item.

Additionally, a sponsored content item may include one or more targeting criteria specified by the publishing user who provided the sponsored content item to the online system 140. Targeting criteria included in a sponsored content item request specify one or more characteristics of users eligible to be presented with the sponsored content item. For example, targeting criteria are used to identify users having user profile information, edges, or actions satisfying at least one of the targeting criteria. Hence, targeting criteria allow a publishing user to identify users having specific characteristics as eligible to be presented with content from a sponsored content item, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows publishing users to further refine users eligible to be presented with sponsored content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), expressing a reaction to an object, and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Various third party systems 130 may include tracking mechanisms in content comprising instructions that, when executed by a client device 110, provide information identifying the content and identifying a user of the online system 140 associated with the client device 110 to the online system 140. In various embodiments, the information provided by the tracking mechanism identifies one or more products associated with a third party system 130 and include in, or otherwise associated with, the identified content. The information identifying the content is stored in the action log 220 in association with information identifying the user to the online system 140. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts (i.e., "sponsored content items"). The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. For example, the content selection module 230 generates a score for sponsored content items by combining bid amounts included in sponsored content items (or expected values of sponsored content items) with expected amounts of interaction with content included in the sponsored content items. The content selection module 230 selects sponsored content items and organic content items for presentation to the user based on their scores and measures of relevance (or expected amounts of interaction), respectively. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items including bid amounts (i.e., "sponsored content items") and other content items that do not include bid amounts (i.e., "organic content items"), such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed of content including a plurality of content items selected for presentation to the user. One or more content items may also be included in the feed of content. The content selection module 230 may also determine the order in which selected content items are presented via the feed of content. For example, the content selection module 230 orders content items content in the feed based on likelihoods of the user interacting with various content items.

The content selection module 230 may account for positions in a feed of content in which content items are presented when generating the feed of content for a user. In various embodiments, the content selection module 230 associates a position discount with different positions in the feed of content. The position discount associated with a position reflects a decrease in expected user interaction with a content item when it is presented in the position. For example, the position discount reflects a decrease in expected user interaction with an organic content item or a sponsored content item content item or an advertisement when presented in a position relative to presentation of the content item in a reference position of the content feed. Determination of position discounts is further disclosed in U.S. patent application Ser. No. 14/049,429, filed on Oct. 9, 2013, which is hereby incorporated by reference in its entirety.

In some embodiments, when generating the feed of content for the user, the content selection module 230 weights expected values, or combinations of expected values and expected amounts of interaction, for sponsored content items by position discounts of positions of the feed of content including the sponsored content items. Similarly, the content selection module 230 weights expected amounts of interaction, or measures of relevance, of organic content items by position discounts of positions of the feed of content including the sponsored content items. The content selection module 230 combines the expected values (or combinations of expected values and expected amounts of interaction) of sponsored content items weighted by position discounts of positions of the feed of content including the sponsored content items and the expected amounts of interaction (or measures of relevance) of the organic content items weighted by position discounts of positions of the feed of content including the organic content items. The content selection module 230 determines combinations of weighted expected values and weighted expected amounts of interaction for different sponsored content items and organic content items in the feed of content and for sponsored content items and organic content items in different positions of the feed of content. Based on the combinations, the online system 230 selects the sponsored content items and the organic content items for inclusion in the feed of content. For example, the content selection module 230 generates the feed as including sponsored content items and organic content items in positions that result in a maximum combination of weighted expected values and weighted expected amounts of interaction for different sponsored content items and organic content items. Example generation of a feed of content accounting for position discounts associated with positions of the feed of content item is further described in U.S. patent application Ser. No. 14/279,280, filed on May 15, 2014, which is hereby incorporated by reference in its entirety. Additional examples of generating a feed of content that accounts for position discounts associated with positions of the feed of content items are further disclosed in U.S. patent application Ser. No. 14/675,009, filed on Mar. 31, 2015, and in U.S. patent application Ser. No. 14/674,936, filed on Mar. 31, 2015, each of which is hereby incorporated by reference herein in its entirety.

Additionally, when generating a feed of content for presentation to a user of the online system 140, the content selection module 235 may place content items into positions in the feed of content subject to one or more content policies that restrict certain content items from being presented in specified positions in feeds of content. For example, a content policy prevents presentation of sponsored content items in certain positions of a content feed (e.g., a first or top position in the feed). As another example, a content policy specifies a minimum number of organic content items separating sponsored content items in the feed of content. The content selection module 230 identifies positions of the feed of content in which sponsored content items are included based on one or more content policies enforced by the online system 140.

In various embodiments, when generating a feed of content for a user, the content selection module 230 selects organic content items for inclusion in the feed and generates the feed of content identifying the organic content items, as further described above. When the feed of content including the organic content items is generated, the content selection module 230 also identifies positions within the feed of content in which sponsored content items are to be included. The content selection module 230 transmits the feed of content including the organic content items to a client device 110 for presentation and selects one or more sponsored content items for inclusion in the identified positions within the feed of content. Subsequently, the content selection module 230 transmits the selected one or more sponsored content items to the client device 110, which modifies the feed of content to include the selected one or more sponsored content items in the identified positions, as further described below in conjunction with FIG. 3. Transmitting the feed of content including the organic content items to a client device 110 and subsequently transmitting the selected sponsored content items to the client device 110, which includes the sponsored content items in the feed of content, reduces an amount of time for the content selection module 230 to provide the feed of content to a user and allows the content selection to account for position discounts associated with different positions in the feed of content for presenting the sponsored content items to increase a likelihood of a user interacting with the sponsored content items.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
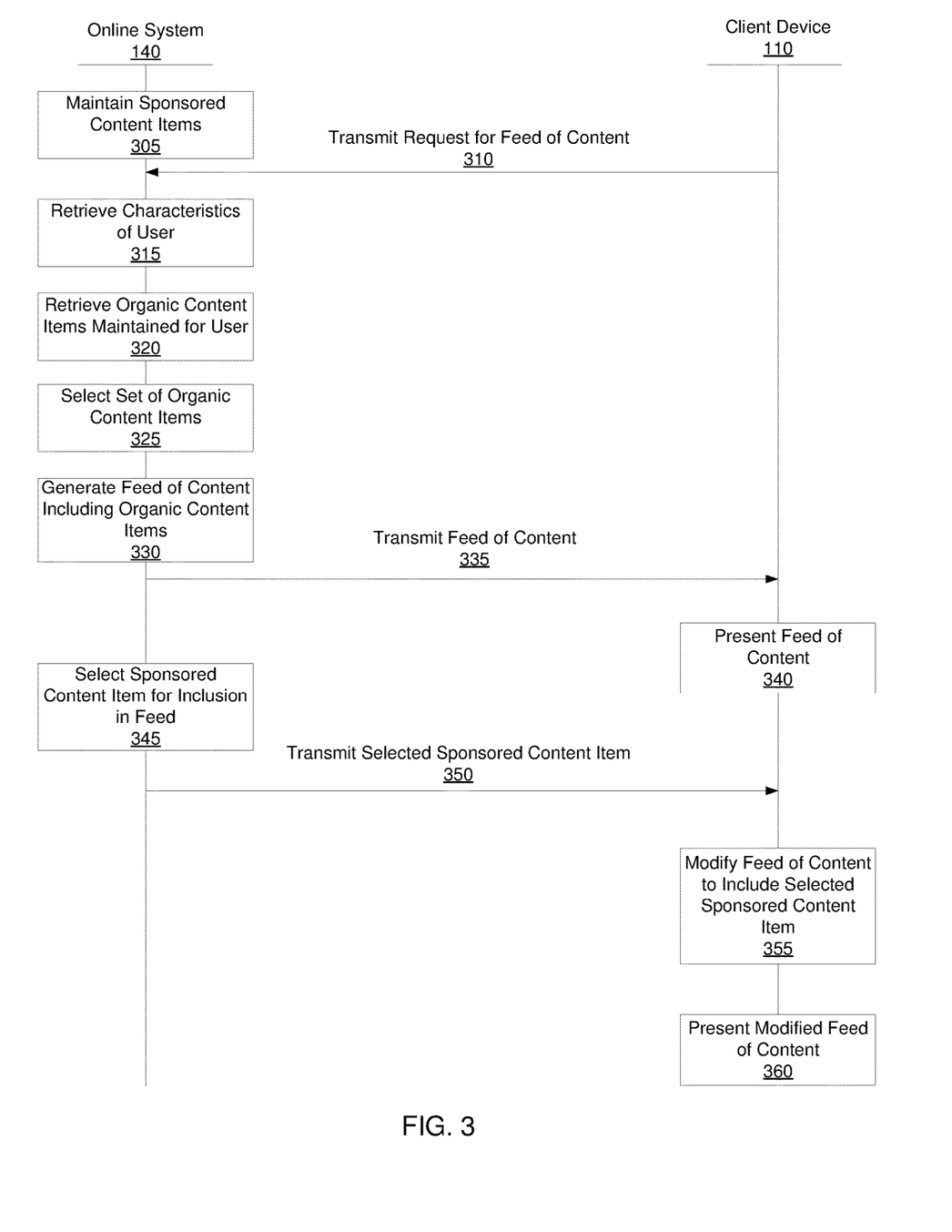
FIG. 3 is an interaction diagram of a method for an online system providing a feed of content including sponsored content and organic content to a user, in accordance with an embodiment.

Providing a Feed of Content Including Sponsored Content and Organic Content to a User FIG. 3 is an interaction diagram of one embodiment of a method for an online system 140 providing a feed of content including sponsored content and organic content to a user. In other embodiments, the method may include different and/or additional steps than those shown in FIG. 3. Additionally, steps of the method may be performed in different orders than the order described in conjunction with FIG. 3 in various embodiments.

The online system 140 receives sponsored content items from one or more publishing users and maintains 305 the sponsored content items. As further described above in conjunction with FIG. 2, each sponsored content item includes content for presentation to users of the online system 140 as well as a bid amount specifying an amount of compensation a publishing user provides to the online system 140 in exchange for presenting the sponsored content item. For example, the bid amount included in a sponsored content item identifies an amount of compensation provided by a publishing to the online system 140 if content in the sponsored content item is presented to a user, if a user to whom content in the sponsored content item is presented performs one or more actions after being presented with the content, or if any suitable condition is satisfied when content in the sponsored content item is presented to a user. For example, the bid amount included in a sponsored content item specifies a monetary amount that the online system 140 receives from a publishing user who provided the content item to the online system 140 if content in the sponsored content item is displayed.

One or more sponsored content items may include an objective specifying a specific action that a publishing user desires other users to perform when presented with content included in the content item. Example objectives include: installing an application associated with the content item, indicating a preference for the content item, sharing a content item with other users, interacting with an object associated with a content item, purchasing an item via an application associated with the content item, or performing any other suitable action. Additionally, a sponsored content item may also include targeting criteria specifying characteristics of users of the online system 140 who are eligible to be presented with content from the sponsored content item in various embodiments. If a sponsored content item includes targeting criteria, the content item is eligible for presentation to users having characteristics satisfying at least a threshold amount of the targeting criteria and is not eligible for presentation to users having characteristics that do not satisfy at least the threshold amount of the targeting criteria. The online system 140 maintains 305 the received sponsored content items in a content store 210 for subsequent retrieval in various embodiments.

A client device 110 associated with a user of the online system 140 transmits 310 a request for a feed of content. For example, an application associated with the online system 140 transmits 310 a request for the feed of content that includes information identifying the user. When the online system 140 receives the request, the online system 140 retrieves 315 characteristics of the user requesting the feed of content maintained by the online system 140. Any suitable characteristics of the user maintained by the online system 140 may be retrieved 315. For example, the online system 140 retrieves 315 connections between the user and other users or objects maintained by the online system 140, interests of the user from a user profile maintained for the user, demographic information included in a user profile maintained for the user, actions performed by the user and logged by the online system 140, and content items previously presented to the user by the online system 140.

Using the retrieved characteristics, the online system 140 retrieves 320 organic content items maintained by the online system 140 for the user. As further described above in conjunction with FIG. 2, an organic content item is a content item that does not include a bid amount. Hence, the online system 140 does not receive compensation from a publishing user in exchange for presenting content included in an organic content item or for users performing a specific interaction after being presented with content from the organic content item. In various embodiments, the organic content item includes content describing one or more actions performed by other users connected to the user via the online system 140 or describing content posted to a page, event, or other object connected to the user via the online system 140.

The online system 140 generates organic content items describing actions performed by users when the users perform actions or describing content posted to one or more pages when the actions are performed or when the content is posted to the one or more pages. In various embodiments, the online system 140 stores organic content items in association with users who performed actions described the organic content items or in association with pages, or other objects, associated with content posted to the online system 140. In response to receiving the request for the feed of content identifying the user, the online system 140 retrieves 320 organic content items associated with other users connected to the user or associated with objects to which the user is connected. The online system 140 may retrieve 320 organic content items satisfying any suitable criteria for presentation to the user in various embodiments. For example, the online system 140 retrieves information identifying one or more objects associated with at least a threshold amount of interests matching interests included in a user profile of the user.

As further described above in conjunction with FIG. 2, the online system 140 selects 325 a set of organic content items by applying one or more selection processes to characteristics of the user and characteristics of the retrieved organic content items. In various embodiments, the online system 140 determines measures of relevance to the user for each organic content item of the set. A measure of relevance to the user for an organic content item is determined by applying one or more models to characteristics of the organic content item and characteristics of the user. In various embodiments, an organic content item's measure of relevance to the user is based on a likelihood of the user performing one or more interactions with the organic content item; the likelihood of the user performing an interaction with the organic content item is determined based on prior interactions by the user with previously presented content items, characteristics of the content item, characteristics of previously presented content items with which the user interacted, and characteristics of the user in various embodiments. In various embodiments, the online system 140 selects 325 the set of organic content items as organic content items having at least a threshold measure of relevance to the user. Alternatively, the online system 140 ranks organic content items based on their measures of relevance to the user and selects 325 the set of organic content items as organic content items having at least a threshold position in the ranking.

For each of the set of organic content items, the online system 140 determines a value to the online system of presenting an organic content item of the set of organic content items to the online system and generates 330 the feed of content including organic content items of the set of organic content items in positions relative to each other determined by the values to the online system of presenting each of the set of organic content items. The value for an organic content item is based at least in part on an expected amount of interaction by the user with the organic content item. The value of an organic content item may be based on specific types of prior actions (e.g., commenting, expressing a preference for a content item, sharing a content item, etc.) by the user associated with previously presented organic content items, in some embodiments. For example, the expected amount of interaction is determined based on the user's prior indications of preference for previously presented organic content items within a specified time interval or based on the user's accessing of previously presented advertisements within a specified time interval. This determination may be based on information retrieved from the user profile store 205, the action log 220, or the edge store 225 describing interactions between the user and presented organic content items.

In various embodiments, when generating 330 the feed of content, the online system 140 applies a position discount corresponding to a position in the feed of content including an organic content item. The value for an organic content item of the set of organic content items is affected by a position of the feed in which the organic content item is presented, so the online system 140 applies a position discount corresponding to the position in the feed in which the organic content item is presented. Determining a position discount value associated with a position in a feed of content is further described in U.S. patent application Ser. No. 14/049,429, filed on Oct. 9, 2013, which is hereby incorporated by reference in its entirety. To generate 335 the feed of content, the online system 140 inserts organic content items of the set of organic content items in different positions of the feed of content and combines values for the organic content items weighted by position discounts corresponding to positions of the feed of content including the organic content items and generates 330 the feed of content to include organic content items of the set in positions of the feed of content that maximizes a combination of values for the organic content items weighted by position discounts corresponding to positions of the feed of content including the organic content items. This allows the online system 140 to generate 330 the feed of content to include organic content items in positions relative to each other that maximizes potential interaction by the user with the feed of content. Example generation of a feed of content accounting for position discounts associated with positions of the feed of content item is further described in U.S. patent application Ser. No. 14/279,280, filed on May 15, 2014, which is hereby incorporated by reference in its entirety. Additional examples of generating a feed of content that accounts for position discounts associated with positions of the feed of content items are further disclosed in U.S. patent application Ser. No, 14/675,009, filed on Mar. 31, 2015, and in U.S. patent application Ser. No. 14/674,936, filed on Mar. 31, 2015, each of which is hereby incorporated by reference herein in its entirety.

The online system 140 transmits 335 the generated feed of content, which includes organic content items, to the client device 110. After receiving the feed of content, the client device 110 presents 340 the feed of content to the user via a display device. This allows the user to view the organic content items included in the feed by the online system 140 via the client device 110.

After transmitting 335 the feed of content to the client device 110, the online system selects 345 a sponsored content item for inclusion in the feed of content. By transmitting 335 the feed of content to the client device 110 before selecting 345 the sponsored content item for the feed of content, the online system 140 allows the user to more quickly view and to interact with organic content items included in the feed of content, while allowing the online system 140 to include a sponsored content item in the feed of content with which the user is most likely to interact. In various embodiments, when the online system 140 generates 330 the feed of content, the online system 140 identifies one or more positions within the feed of content in which sponsored content items are included. As further described above in conjunction with FIG. 2, the online system 140 applies one or more content policies that restrict certain content items from being presented in specified positions in feeds of content to the generated feed that includes organic content items in various positions. For example, a content policy prevents presentation of sponsored content items in certain positions of a content feed (e.g., a first or top position in the feed). As another example, a content policy specifies a minimum number of organic content items separating sponsored content items in the feed of content. Application of the one or more content policies allows the online system 140 to identify one or more positions of the feed of content in which content items are eligible to be included.

To include a sponsored content item in a position of the feed of content relative to one or more organic content items, the online system 140 selects 345 a sponsored content item of the maintained sponsored content items based on expected values for various sponsored content items and a position discount of the position of the feed of content. For example, the online system 140 identifies a position discount corresponding to the position of the feed of content, weights expected values of different sponsored content items by the position discount, and selects 345 a sponsored content item based on the weighted expected values. In some embodiments, the online system 140 selects a sponsored content item having a maximum expected value weighted by the position discount for the position of the feed of content.

Alternatively, the online system 140 determines a score for each sponsored content item, with a score of a sponsored content item based on an expected value of the sponsored content item and an expected amount of interaction with content from the sponsored content item by the user. As further described above, the online system 140 applies one or more models to characteristics of the user and characteristics of content in the sponsored content item to determine the expected amount of interaction with content from the sponsored content item. The expected amount of interaction with content from the sponsored content item may be based on specific types of prior actions (e.g., commenting, expressing a preference for a content item, sharing a content item, etc.) by the user associated with previously presented organic content items or with previously presented sponsored content items, in some embodiments. For example, the expected amount of interaction is determined based on the user's prior indications of preference for previously presented organic or sponsored content items within a specified time interval or based on the user's selection of previously presented organic or sponsored content items within a specified time interval. This determination may be based on information retrieved from the user profile store 205, the action log 220, or the edge store 225 describing interactions between the user and presented organic content items. This allows the score of a sponsored content item to account for the expected compensation to the online system 140 from presenting the sponsored content item as well as a benefit to the online system 140 from interaction with the sponsored content item. In various embodiments, the online system 140 uses a conversion factor to convert the bid amount included in a sponsored content item, or the expected value of a sponsored content item, and the expected amount of interaction by the user with the sponsored content item into a common unit of measurement, allowing a single score associated with the advertisement to account for the expected amount of user interaction with the sponsored content item and the bid amount included in the sponsored content item (or the expected value of the sponsored content item). Combining a bid amount (or an expected value) with an expected amount of user interaction is further described in U.S. patent application Ser. No. 13/545,266, filed on Jul. 10, 2012, which is hereby incorporated by reference in its entirety.

The online system 140 selects 345 the sponsored content item for inclusion in the position of the feed of content relative to one or more organic content items by combining values for the organic content items included in the feed of content weighted by position discounts corresponding to positions of the feed of content including the organic content items and scores for various sponsored content items weighted by the position discount corresponding to the position of the feed. In some embodiments, the online system 140 identifies a set of sponsored content items based on their expected values (e.g., sponsored content items having at least a threshold expected value or sponsored content items having at least a threshold position in a ranking based on expected values) and combines values for the organic content items included in the feed of content weighted by position discounts corresponding to positions of the feed of content including the organic content items and scores for various sponsored content items of the identified set weighted by the position discount corresponding to the position of the feed. The online system 140 selects 345 a sponsored content for inclusion in the position as a sponsored content item that maximizes a combination of values for the organic content items weighted by position discounts corresponding to positions of the feed of content including the organic content items and a score for the sponsored content item weighted by the position discount of the position. This allows the online system 140 to select 345 a sponsored content item of the subset that that maximizes potential interaction by the user with the feed of content, while maximizing an expected amount of compensation the online system 140 receives from presentation of the sponsored content item. The online system 140 transmits 350 content from the selected sponsored content item to the client device 110 for presentation to the user. In various embodiments, the online system 140 transmits 350 the content from the selected sponsored content item and an identifier of the position of the feed of content in which the content from the selected sponsored content item is to be presented to client device 110. The online system 140 may alternatively or additionally transmit 350 instructions for including the selected sponsored content item in the position of the feed of content in conjunction with the selected sponsored content item; hence, executing the instructions received in conjunction with the selected sponsored content item allows the client device 110 to modify the feed of content to include the selected sponsored content item.

The client device 110 modifies 355 the feed of content previously received from the online system 140 to include the selected sponsored content item and presents 360 the modified feed of content to the user. In various embodiments, the client device 110 receives one or more content policies restricting positioning of the sponsored content item within the feed of content relative to organic content items included in the feed of content along with the selected sponsored content item. The client device 110 applies one or more of the content policies to the previously received feed of content to determines a position of the feed of content in which the sponsored content item is included and modifies 355 the feed of content to include the sponsored content item in the determined position. In various embodiments, the client device 110 determines whether a position in the feed of content received along with the sponsored content item has previously been presented to the user and determines an alternative position in the feed of content in which the selected sponsored content item is included. For example, the client device 110 applies the one or more content policies to the feed of content to determine the alternative position of the feed of content in response to determining the position in the feed of content received along with the sponsored content item has previously been presented to the user.

The client device 110 stores the one or more content policies prior to receiving the selected sponsored content item in various embodiments. For example, the one or more content policies are included in an application associated with the online system 140, so the one or more content policies are stored on the client device 110 when the application associated with the online system 140 is installed on the client device 110. The online system 140 may transmit the one or more content policies to the client device 110 at various times (e.g., at periodic time intervals), and the client device 110 stores the one or more content policies. When the client device 110 receives the selected sponsored content item, the client device 110 retrieves the locally stored one or more content policies and applies the one or more content policies to the feed of content to identify a position of the feed of content in which the selected sponsored content item is included, as further described above.

In various embodiments, the client device 110 may use any suitable criteria to identify an alternative position of the feed of content in which the selected sponsored content item is included. For example, in response to determining the position the position in the feed of content received along with the sponsored content item has previously been presented to the user, the client device 110 identifies an ending position of the feed of content presented 340 to the user by the client device 110 and modifies 355 the feed of content to include the selected sponsored content item in a position of the feed subsequent to the identified ending position of the feed of content. The position of the feed subsequent to the identified ending position of the feed of content may be determined by application of one or more content policies to the feed of content by the client device 110 in various embodiments. As another example, in response to determining the position in the feed of content received along with the sponsored content item has previously been presented to the user, the client device 110 identifies an alternative position in the feed that is subsequent to the position in the feed of content and modifies 355 the feed of content to include the selected sponsored content item in the alternative position. The client device 110 may apply one or more content policies or any other suitable criteria to identify the alternative position in the feed.

Additionally, the client device 110 may determine not to include the selected sponsored content item in the feed of content based on any suitable characteristics. If the client device 110 determines not to include the selected sponsored content item in the feed of content, the client device 110 transmits a notification to the online system 140 that the selected sponsored content item is not included in the feed of content. For example, the client device 110 determines that at least a threshold amount of the feed of content has been presented to the user or that the user has performed one or more specific actions with the feed of content and does not include the selected sponsored content item in the feed of content in response to the determination. In the preceding example, the client device 110 does not modify 355 the feed of content to include the selected sponsored content item and transmits a notification to the online system 140 that the selected sponsored content item is not included in the feed of content. If the online system 140 receives a notification that the selected sponsored content item was not included in the feed of content, the online system 140 may store the selected sponsored content item in association with the user to increase a likelihood of the online system 140 include in the sponsored content item when the online system generates another feed of content or selects additional content for inclusion in the feed of content.

By initially generating 330 the feed of content including organic content items selected 325 for the user and transmitting 335 the feed of content including the organic content items to a client device 110 for presentation 340 while the online system 140 selects 345 a sponsored content item for inclusion in the feed of content, the online system 140 reduces an amount of time from receiving a request for a feed of content from a user and presentation 340 of the feed of content to the user. Including organic content items in the feed of content initially presented to the user allows the online system 140 to provide the user with content likely to increase user interaction with the online system 140. Selecting 345 one or more sponsored content items for inclusion in the feed of content while the organic content items included in the feed of content are presented and subsequently modifying the feed of content to include the selected one or more sponsored content items, allows the online system 140 to select 345 sponsored content items more likely to increase user interaction with the feed of content or to increase compensation to the online system 140 from presentation of sponsored content items by performing a more detailed selection process or allocation more time for selecting 345 sponsored content items. For example, transmitting 335 a feed of content including organic content items and subsequently selecting 345 one or more sponsored content items to include in the feed of content allows the online system 140 to account for contextual information about the feed of content (e.g., organic content items included in the feed, a position of a sponsored content item in the feed of content relative to organic content items included in the feed of content) when selecting 345 sponsored content items, which may increase compensation received by the online system 140, without delaying presentation of organic content items to a user. As evaluating sponsored content items while accounting for contextual information about the feed of content (e.g., organic content items included in the feed, a position of a sponsored content item in the feed of content relative to organic content items included in the feed of content) including one or more of the sponsored content items is computationally intensive, providing the organic content items included in the feed of content to the user while selecting 345 sponsored content items increases a quality of a sponsored content item selected 345 for inclusion in a position of the feed of content without delaying presentation of organic content items included in the feed of content to a user.

Figure 4:
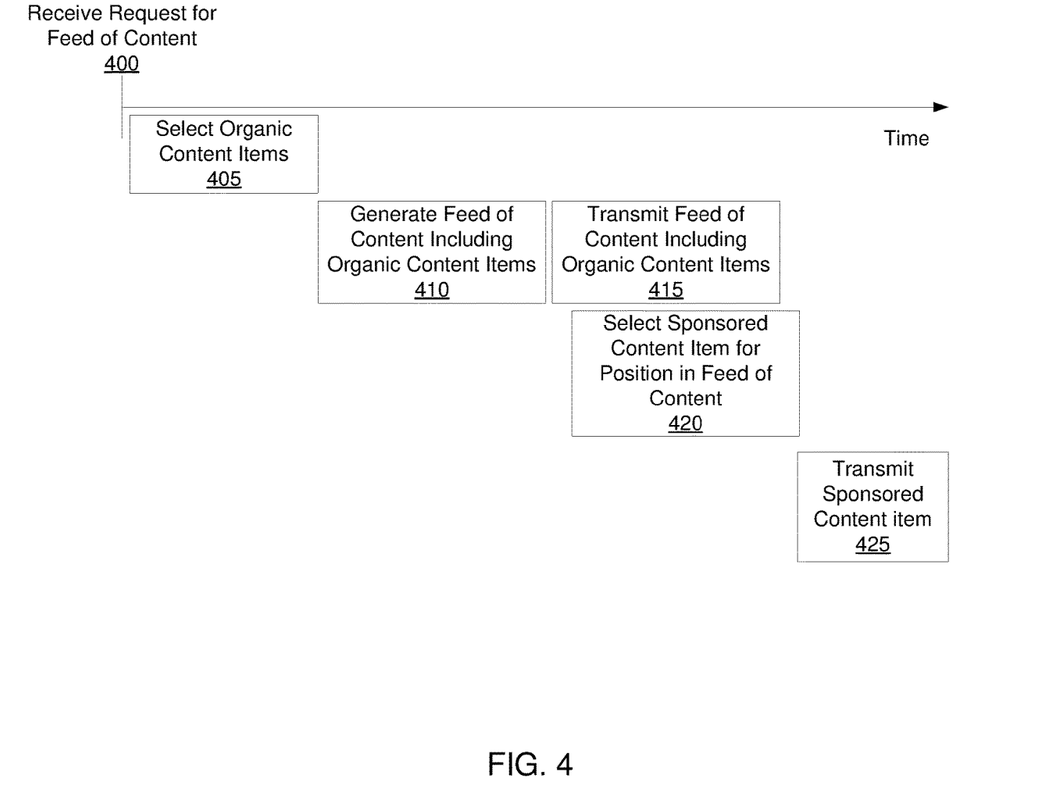
FIG. 4 is an example timing diagram of an online system generating a feed of content for a user of the online system including organic content items and sponsored content items, in accordance with an embodiment.

FIG. 4 is an example timing diagram of an online system 140 generating a feed of content for a user of the online system 140 including organic content items and sponsored content items. As shown in FIG. 4, the online system 140 receives 400 a request for a feed of content from a user and subsequently selects 405 organic content items capable of being included in the feed of content, as further described above in conjunction with FIGS. 2 and 3. Based on characteristics of the user and characteristics of various organic content items, the online system 140 generates 410 the feed of content including organic content items and identifying positions of the feed of content in which sponsored content items are to be included, as further described above in conjunction with FIGS. 2 and 3. After generating 410 the feed of content including organic content items and identifying positions of the feed of content including sponsored content items, the online system 140 transmits 415 the feed of content including the organic content items to a client device 110, which presents the feed of content including the organic content items to the user. After transmitting 415 the feed of content including the organic content items to the client device 110, the online system selects 420 a sponsored content item for inclusion in a position of the feed of content while accounting for contextual information about the feed of content (e.g., organic content items included in the feed, a position of a sponsored content item in the feed of content relative to organic content items included in the feed of content), as further described above in conjunction with FIG. 3. Subsequently, the online system 140 transmits 430 the selected sponsored content item to the client device 110 for inclusion in the feed of content to a client device 110. As further described above in conjunction with FIG. 3, the client device 110 modifies the feed of content to include the selected sponsored content item and presents the modified feed of content to the user to present the sponsored content item to the user via the feed of content.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining, at an online system, sponsored content items, each sponsored content item including content for presentation and a bid amount specifying an amount of compensation provided to the online system;
receiving, at the online system, a request for a feed of content from a client device associated with a user of the online system;
retrieving characteristics of the user maintained by the online system;
retrieving organic content items maintained by the online system for the user for which the online system does not receive compensation for presenting to the user;
selecting a set of organic content items by the online system applying one or more selection processes to characteristics of the organic content items and the retrieved characteristics of the user;
generating the feed of content including organic content items of the set in positions relative to each other by the online system and not including one or more sponsored content items;
transmitting the feed of content not including one or more sponsored content items from the online system to the client device associated with the user;
determining expected values to the online system of presenting content included in each of at least a set of sponsored content items based on bid amounts included in each sponsored content item of the set of sponsored content items and characteristics of the user after transmitting the feed of content to the client device associated with the user;
selecting a sponsored content item for inclusion in a position of the feed of content relative to positions of one or more organic content items included in the feed based on expected values of the sponsored content items and a position discount of the position after transmitting the feed of content including the organic content items of the set and not including one or more sponsored content items to the client device associated with the user, the position discount reflecting a decrease in expected user interaction with the sponsored content item when presented in the position relative to presentation of the sponsored content item in a reference position of the feed of content; and
transmitting the selected sponsored content item to the client device for inclusion in the position of the feed of content previously transmitted to the client device associated with the user and instructions for displaying the selected sponsored content item in the position of the feed of content in conjunction with display of the one or more organic content items included in the feed of content in other positions of the feed of content based on positions of the feed of content previously displayed to the user by the client device, the instructions, when executed by the client device, causing the client device to identify an ending position of the feed of content displayed to the user by the client device and to insert the selected sponsored content item in an alternative position of the feed subsequent to the identified ending position of the feed of content in response to determining the position of the feed of content for which the sponsored content item was selected for inclusion has previously been presented to the user via the feed previously transmitted to the client device associated with the user, the alternative position of the feed satisfying one or more content policies from the online system restricting positioning of the sponsored content item within the feed of content relative to other sponsored content items within the feed of content.

2. The method of claim 1, wherein the instructions comprise one or more content policies restricting positioning of the sponsored content item within the feed of content relative to organic content items included in the feed of content.

3. The method of claim 1, wherein generating the feed of content including organic content items of the set in positions relative to each other comprises:
determining values to the online system of presenting each of the set of organic content items, a value to the online system of presenting an organic content item of the set based on an expected amount of user interaction with the organic content item of the set; and
generating the feed of content by including organic content items of the set in positions relative to each other based on the values to the online system of presenting each of the set of organic content items.

4. A method comprising:
transmitting a request for a feed of content from a client device to an online system, the request identifying a user of the online system and the feed of content;
receiving the feed of content from the online system, the feed of content including organic content items in positions relative to each other;
presenting, by the client device, the feed of content including the organic content items in the positions relative to each other;
receiving a sponsored content item from the online system for presentation in a position of the feed of content after presenting the feed of content including the organic content items, the sponsored content item including a bid amount specifying an amount of compensation provided to the online system and content for presentation;
modifying, by the client device, the feed of content to include the content from the sponsored content item in the position of the feed of content in conjunction with the one or more organic content items included in the feed of content based on positions of the feed of content previously presented to the user by the client device by:
identifying an ending position of the feed of content presented to the user by the client device in response to determining the position of the feed of content previously transmitted to the client device associated with the user has previously been presented to the user via the feed of content; and
inserting the content from the sponsored content item in an alternative position of the feed subsequent to the identified ending position of the feed of content, the alternative position of the feed satisfying one or more content policies from the online system restricting positioning of the sponsored content item within the feed of content relative to other sponsored content items within the feed of content; and
presenting the modified feed of content by the client device.

5. The method of claim 4, wherein modifying, by the client device, the feed of content to include the content from the sponsored content item comprises:

determining the position in the feed of content for presenting the content from the sponsored content item has been presented;

identifying an alternative position in the feed of content that has not been presented; and modifying the feed of content to include the content from the sponsored content item in the alternative position.

6. The method of claim 5, wherein identifying the alternative position in the feed of content that has not been presented comprises:

obtaining one or more content policies restricting positioning of the sponsored content item within the feed of content; and determining the alternative position in the feed of content that has not been presented subject to the one or more content policies.

7. The method of claim 6, wherein obtaining one or more content policies restricting positioning of the sponsored content item within the feed of content comprises:

retrieving one or more content policies restricting positioning of the sponsored content item within the feed of content from the client device.

8. The method of claim 5, wherein the one or more content policies were received by the client device from the online system with the content from the sponsored content item.

9. The method of claim 4, wherein modifying, by the client device, the feed of content to include the content from the sponsored content item comprises:

obtaining one or more content policies restricting positioning of the sponsored content item within the feed of content; and determining the position in the feed of content to include the content from the sponsored content item by applying the one or more content policies to the feed of content.

10. The method of claim 4, wherein modifying, by the client device, the feed of content to include the content from the sponsored content item comprises:

determining not to include the content from the sponsored content item in the feed of content based on one or more characteristics of the feed of content.

11. The method of claim 10, wherein a characteristic of the feed of content is selected from a group consisting of: an amount of the feed of content presented to the user, actions performed by the user with the feed of content, and any combination thereof.

12. The method of claim 10, wherein modifying, by the client device, the feed of content to include the content from the sponsored content item further comprises:

transmitting a notification to the online system that the sponsored content item was not included in the feed of content.

13. A computer program product comprising a non-transitory computer readable storage medium having instructions encoded thereon that, when executed by a processor, cause the processor to:

transmit a request for a feed of content from a client device to an online system, the request identifying a user of the online system and the feed of content;

receive the feed of content from the online system, the feed of content including organic content items in positions relative to each other;

present, by the client device, the feed of content including the organic content items in the positions relative to each other;

receive a sponsored content item from the online system for presentation in a position of the feed of content after presenting the feed of content including the organic content items, the sponsored content item including a bid amount specifying an amount of compensation provided to the online system and content for presentation;

modify, by the client device, the feed of content to include the content from the sponsored content item in the position of the feed of content in conjunction with the one or more organic content items included in the feed of content based on positions of the feed of content previously presented to the user by the client device by:

identifying an ending position of the feed of content presented to the user by the client device in response to determining the position of the feed of content previously transmitted to the client device associated with the user has previously been presented to the user; and inserting the content from the sponsored content item in an alternative position of the feed subsequent to the identified ending position of the feed of content, the alternative position of the feed satisfying one or more content policies from the online system restricting positioning of the sponsored content item within the feed of content relative to other sponsored content items within the feed of content; and present the modified feed of content by the client device.

14. The computer program product of claim 13, wherein modify, by the client device, the feed of content to include the content from the sponsored content item comprises:

determine the position in the feed of content for presenting the content from the sponsored content item has been presented;

identify an alternative position in the feed of content that has not been presented; and modify the feed of content to include the content from the sponsored content item in the alternative position.

15. The computer program product of claim 14, wherein identify the alternative position in the feed of content that has not been presented comprises:

obtain one or more content policies restricting positioning of the sponsored content item within the feed of content; and determine the alternative position in the feed of content that has not been presented subject to the one or more content policies.

16. The computer program product of claim 13, wherein modify, by the client device, the feed of content to include the content from the sponsored content item comprises:

determine not to include the content from the sponsored content item in the feed of content based on one or more characteristics of the feed of content.

* * * * *